(12) United States Patent
Jefferson

(10) Patent No.: US 10,698,911 B1
(45) Date of Patent: Jun. 30, 2020

(54) METHOD FOR RANKING POSSIBLE CAUSES FOR ANOMALIES IN LARGE DATA SETS

(71) Applicant: Keysight Technologies, Inc., Minneapolis, MN (US)

(72) Inventor: Stanley T. Jefferson, Palo Alto, CA (US)

(73) Assignee: Keysight Technologies, Inc., Santa Rosa, CA (US)

(*) Notice: Subject to any disclaimer, the term of this patent is extended or adjusted under 35 U.S.C. 154(b) by 289 days.

(21) Appl. No.: 15/922,776

(22) Filed: Mar. 15, 2018

(51) Int. Cl.
  *G06F 16/2457* (2019.01)
  *G06F 16/23* (2019.01)
  *G06F 16/2458* (2019.01)

(52) U.S. Cl.
  CPC .... *G06F 16/24578* (2019.01); *G06F 16/2365* (2019.01); *G06F 16/2462* (2019.01)

(58) Field of Classification Search
  CPC ........... G06F 16/24578; G06F 16/2365; G06F 16/2462
  USPC ...................................................... 707/748
  See application file for complete search history.

(56) References Cited

U.S. PATENT DOCUMENTS

| | | | |
|---|---|---|---|
| 6,094,651 A * | 7/2000 | Agrawal | G06F 16/283 |
| 7,065,534 B2 * | 6/2006 | Folting | G06N 7/00 707/603 |
| 7,162,489 B2 * | 1/2007 | Folting | G06N 7/00 707/600 |
| 7,426,497 B2 * | 9/2008 | Bacioiu | G06K 9/6262 706/12 |
| 7,849,048 B2 * | 12/2010 | Langseth | G06F 16/254 707/602 |
| 8,713,422 B2 * | 4/2014 | Chamberlain | G06F 40/103 715/217 |
| 9,477,732 B2 * | 10/2016 | Helfman | G06F 16/26 |
| 10,102,241 B2 * | 10/2018 | Zorn | G06F 16/252 |
| 2005/0288883 A1 * | 12/2005 | Folting | G06N 7/00 702/102 |

(Continued)

OTHER PUBLICATIONS

Farshchi, Mostafa, et al., "Experience Report: Anomaly Detection of Cloud Application Operations Using Log and Cloud Metric Correlation Analysis", ISSRE 2015, Gaithersburg, MD, Nov. 2-5, 2015, pp. 24-24.*

(Continued)

*Primary Examiner* — Robert Stevens

(57) ABSTRACT

A method of operating a data processing system is disclosed. The method causes the data processing system to analyze a database that includes a measurement table characterized by one or more measurement condition columns and one or more measured parameter columns. Each row of the measurement table corresponding to an instance of the measured parameter values and the measurement condition values associated with the measured parameter values. The data processing system defines a target group that includes a plurality of rows in the measurement table and a remainder group that includes a plurality of rows in the measurement table that are different from the target group. The data processing system defines a measurement condition to be explored. A relevance measure is computed for each of the different measurement condition values and displayed.

20 Claims, 4 Drawing Sheets

(56) References Cited

U.S. PATENT DOCUMENTS

2006/0106560 A1* 5/2006 Folting .................. G06N 7/00
702/102
2017/0337238 A1* 11/2017 Zorn .................. G06F 16/252

OTHER PUBLICATIONS

Wang, Chengwei, et al., "Statistical Techniques for Online Anomaly Detection in Data Centers", INM 2011, Dublin, Ireland, May 23-27, 2011, pp. 385-392.*

Kandel, Sean, et al., "Profiler: Integrated Statistical Analysis and Visualization for Data Quality Assessment", AVI '12, Capri Island, Italy, May 21-25, 2012, pp. 547-554.*

Stoffel, Florian, et al., "Finding Anomalies in Time-Series using Visual Correlation for Interactive Root Cause Analysis", VizSec '13, Atlanta, GA, Oct. 14, 2013, pp. 65-72.*

Walton, Simon, et al., "Multiple Queries with Conditional Attributes (QCATs) for Anomaly Detection and Visualization", VizSec '14, Paris, France, Nov. 10, 2014, pp. 17-24.*

Roy, et al., A Formal Approach to Finding Explanations for Database Queries, Sigmod'14, Jun. 22-24, 2014, pp. 1579-1590, Snowbird, Utah.

Meliou, et al., Causality and Explanations in Databases, Large Data Bases, Proceedings of the VLDB Endowment, vol. 7, No. 13, Sep. 1-5, 2014, Hangzhou, China, 2 pages.

Han, et al., Frequent Pattern Mining: Current Status and Future Directions, Springer Science+Business Media, LLC, pp. 55-86, Jan. 27, 2007.

Bailis, et al., Prioritizing Attention in Fast Data: Principles and Promise, 8th Biennial Conference on Innovative Data Systems Research (CIDR '17), Jan. 8-11, 2017, Charminade, California, 8 pages.

Bailis, et al., MacroBase: Prioritizing Attention in Fast Data, Sigmod'17, Stanford InfoLab and MIT CSAIL, May 14-19, 2017, Chicago, Illinois, 16 pages.

Bailis, et al., MacroBase: Analytic Monitoring for the Internet of Things, Cambridge Mobile Telematics,Stanford University MIT CSAIL, Mar. 17, 2016, Cambridge, Massachusetts, 12 pages.

* cited by examiner

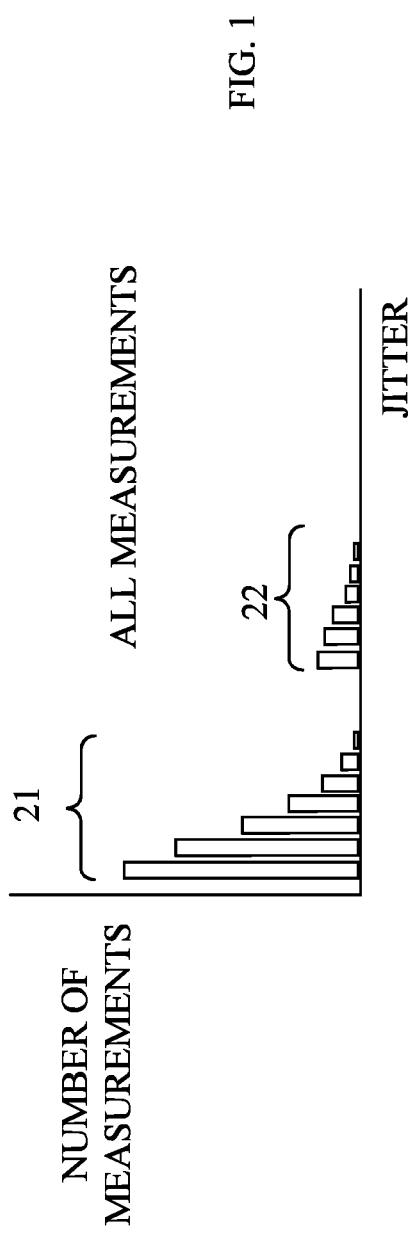
FIG. 1
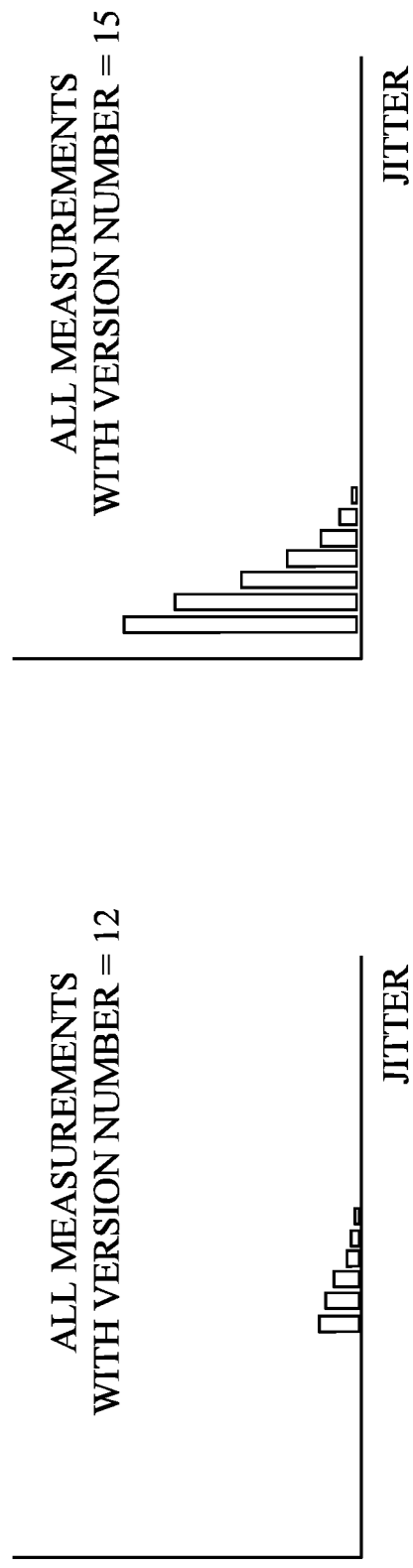
FIG. 2
FIG. 3

METHOD FOR RANKING POSSIBLE CAUSES FOR ANOMALIES IN LARGE DATA SETS

BACKGROUND

The amount of data generated by modern test equipment and measurement equipment has increased to the point that test personnel cannot understand the data without the help of data processing systems to summarize various aspects of the large data sets generated by such equipment. Typically, each test generates a record which includes a value for the parameter or parameters being measured together with a number of parameters that describe the conditions under which the measurement was made. For example, a test of a communication circuit board might measure the bit error rate or jitter of the communication signal. In addition, various environmental parameters such as the temperature of a component on the board, the ambient temperature at the test apparatus, the operator of the test equipment, and the identity of one or more component parts of the circuit board may also be noted. The additional parameters will be referred to as the measurement conditions in the following discussion, while the measured bit error rate and the jitter will be referred to as the measured values. On a production line for qualifying the circuit boards, hundreds of thousands of these records can be generated. Understanding a data set of this magnitude requires a level of data analysis that is greater than a test engineer can provide without some form of computer system.

In such testing systems, determining the measurement conditions that may explain an anomaly in the measured values presents significant challenges for an engineer who is not also a skilled programmer.

SUMMARY

The present invention includes a method of operating a data processing system, a computer readable medium that causes a data processing system to execute the method, and a multi-processor data processing system that provides the analysis in real time. The method of the present invention causes the data processing system to analyze a database that includes a measurement table characterized by one or more measurement condition columns and one or more measured parameter columns. Each row of the measurement table corresponding to an instance of the measured parameter values and the measurement condition values associated with the measured parameter values. The method causing the data processing system to define a target group that includes a plurality of rows in the measurement table and a remainder group that includes a plurality of rows in the measurement table that are different from the target group. The data processing system defines a measurement condition to be explored, the measurement condition values having a plurality of different values. A relevance measure is computed for each of the different measurement condition values, and a list of each of the different measurement condition values and the relevance measure corresponding to that measurement condition value for measurement condition values that have relevance measures greater than a display threshold is displayed.

In one aspect of the invention, the list is ordered by the relevance measure values.

In another aspect of the invention, the data processing system displays a statistical distribution of the measured parameter values for a selected one of the measured parameter columns, and receives user input as to a threshold value that separates the target group from the remainder group.

In another aspect of the invention, the target group includes rows in which the measured parameter values satisfy a condition specified by a user.

In another aspect of the invention, the data processing system displays a statistical distribution of measured parameter values in the target group.

In another aspect of the invention, the data processing system quantizes the measurement condition values in one of the measurement condition columns. In another aspect of the invention, the data processing system utilizes user input that determines the number of quantized states to use in quantizing the measurement condition values.

In another aspect of the invention, the data processing system adds a measurement condition column to the measurement table in response to user input and a user specifies an algorithm for populating the added measurement condition column. The algorithm depends on one or more of the other measurement column values.

The present invention also includes a multi-processor computing system that is adapted for analyzing a database that includes a measurement table characterized by one or more measurement condition columns and one or more measured parameter columns, each row of the measurement table corresponding to an instance of the measured parameter values and the measurement condition values associated with the measured parameter values. The data processing system includes a plurality of relevance processors, each relevance processor includes a measurement condition column memory that stores a corresponding one of the measured condition columns and a master data processor that includes a memory that stores the measured parameter columns. The data processing system also includes a user interface adapted for receiving instructions from a user and displaying computational results to the user.

The master processor defines a target group that includes a plurality of rows in the measurement table and a remainder group that includes a plurality of rows in the measurement table that are different from the target group, and defining one or more measurement conditions to be explored, the measurement condition values having a plurality of different values. Each of the relevance processors computes a relevance measure for each of the different values for the measurement condition stored in that relevance processor. The master processor displays a list of each of the different measurement condition values and the computed relevance parameter for that measurement condition value.

BRIEF DESCRIPTION OF THE DRAWINGS

FIG. 1 illustrates the statistical distribution of jitter measurement values in an exemplary measurement database.

FIG. 2 illustrates the distribution of jitter values for records having chip version 12.

FIG. 3 illustrates the distribution of jitter values for records having chip version 15.

DETAILED DESCRIPTION

Figures 4, 5:
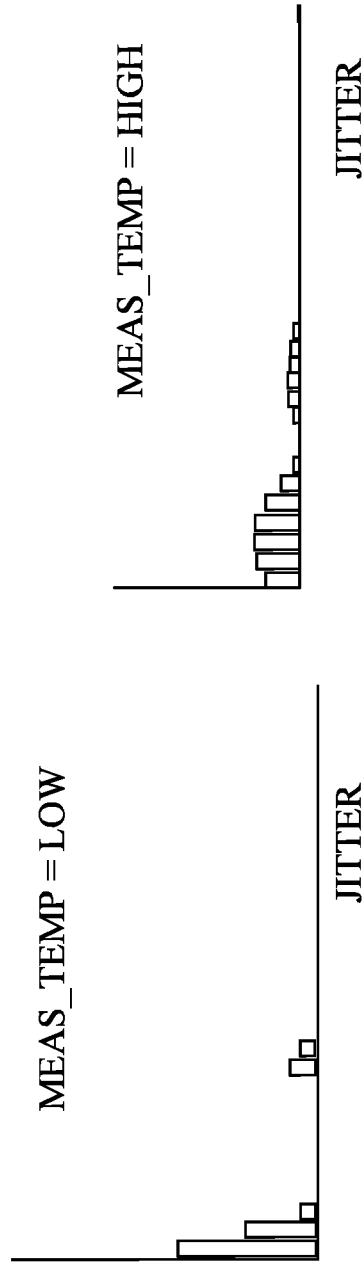
FIGS. 4 and 5 illustrate the distribution of jitter values for records having two different temperatures of a component on the board.

The manner in which the present invention provides its advantages can be more easily understood in terms of a production line in which parts are tested prior to being accepted for shipment to customers. The testing setup can include multiple test stations. Each test station measures a part and generates one or more measured values for that part.

One or more measurement conditions are associated with each part. The measurement conditions can describe the testing conditions such as the test station, date and time of the test, temperature of the part during the test, ambient temperature at the time of the test, etc. The measurement conditions can also include information about the part such as the version number of a component in the part. For example, the part may include a number of sub-components, and one of the components has a plurality of versions; hence, the version number of that part could be one of the measurement conditions.

Each test includes one or more measured values. Each measured value corresponds to one "measured parameter". A measured value is an instance of a corresponding measured parameter. Similarly, a measurement condition value is an instance of a corresponding measurement condition. A measured parameter may be a simple measurement such as a voltage at a specific point on the part or a value that is derived from such measurements such as jitter measurement. The measured values for each measured parameter have a plurality of states. The values can be simple digitized numbers or digitally-valued vectors or some variable that can be mapped to a digital value having more than one state, such as a string variable that can have multiple values. For example, a "pass/fail" result from a test can be mapped to a two-state binary value.

In one aspect of the invention, the measured parameter values and the corresponding measurement condition values are stored in a database. To simplify the following discussion, the database will be assumed to have a table having one row for each measurement. The columns of the table can be viewed as having two groups of columns. One group contains the measurement condition values, there being one column corresponding to each measurement condition. The other group contains the measured parameter values, one column corresponding to each measured parameter.

While the following discussion assumes a single table in the database, it is to be understood that the database may have multiple tables in which the measured parameter values and the corresponding measurement condition values are stored. Any database structure that allows such a table or structure analogous to such a table, to be assembled through appropriate queries of the database can also be utilized.

The present invention separates the rows of the table into two non-overlapping groups. The first group will be referred to as the "target group", and the second group will be referred to as the "remainder group". Then the present invention searches for combinations of measurement condition values that are strongly associated with the target group. The search results are ranked by their importance and relevance, thereby enabling the user to rapidly gain insight about the target group. In the simplest case, the target group would include the rows in which a particular measured parameter value was greater than or less than some specified threshold value or equal to a particular value, such as having a pass/fail measurement parameter equal to "fail". However, as will be explained in more detail below, the groups can be separated based on any function of the measurement parameter values in a row, including functions that depend on multiple measurement parameters.

One commonly encountered problem relates to understanding the cause(s) of outliers in one of the measurement parameter distributions. Consider the simple case in which a communication board is being tested at each test station and the jitter in the output signal is measured. Each board measurement is characterized by a number of measurement condition values such as the test station identification, the ambient temperature, the temperature of a component on the board, the version number of a critical part on the board, voltage on a power rail, antenna type, carrier frequency, modulation type, etc.

Refer now to FIG. 1, which illustrates the statistical distribution of jitter measurement values in an exemplary measurement database. FIG. 1 is a plot of the number of measurements having a given jitter value as a function of the jitter value. Data is presented as a histogram. It is noted that a group of outliers is present as shown at 22. The outliers have substantially higher jitter values than the "inliers" shown at 21. A person analyzing the test data wants to know if there are particular measurement conditions that are more associated with the outliers than inliers.

In this simple example, the measurement condition value that is associated with the outliers is the chip version discussed above. FIGS. 2 and 3 illustrate the distribution of jitter values for records having chip version 12 and chip version 15, respectively. It is clear from these figures that the boards with chip version 12 account for the outlier distribution 22, since the outliers are not seen in boards having chip version 15.

While the above example illustrates the basic principle, in practice, finding such explanations presents a number of challenges. Consider a case in which the number of possible states for one of the measurement conditions is large. For example, one of the measurement conditions could be the temperature of a particular chip on the board. The temperature could vary by more than 100 degrees. To test the various temperature values as possible explanations, 100 different queries of the database would be followed by constructing a histogram for each of the results. In addition to the computation workload inherent in such tests, the number of records corresponding to each temperature reading could be too small to provide a statistically valid explanation for many of the temperature values. Furthermore, the results will, in general, be much less clear than the results in the simple example.

Still further, the time to analyze each possible explanation can be prohibitive, particularly in cases in which the number of measured conditions is large and the number of possible measurement condition values is also large for several of those measurement conditions.

The problems inherent in a measurement condition that has a large number of possible values are mitigated in the present invention by quantizing the measurement condition values. Replacing a value by a quantized value is defined to be a process in which the values are mapped to a set of quantized values in which the number of possible quantized values is less than the number of possible measured values. For example, the temperature condition discussed above having 100 possible values is mapped to three temperature values, high, medium, and low. Hence, only three values need to be tested when checking for associations between temperature condition and the target group.

Refer now to FIGS. 4 and 5, which illustrate the distribution of jitter values for records having two different temperatures of a component on the board. It clear from these examples that higher measurement temperatures lead to higher jitter.

If one of these quantized values shows a significant association with the target group, the quantized value in question can be replaced by a new set of quantized values to test for associations at a finer level of quantization, without having to retest the two-thirds of the possible values that were found to have insignificant associations with the target group.

In addition, the quantization improves the statistical accuracy of the test for association. As will be explained in more detail below, the relevance of a particular association between a measured condition and the target group depends on the number of rows in the data table that have a value for the measured condition that is equal to the value being tested. If the measured condition value is too "fine grained", the number of rows will have a limited statistical accuracy, and hence, the resulting measure of relevance will have a significant statistical uncertainty.

Even with quantization of the measurement condition values, the number of possible combinations of measurement conditions can be very large. For example, a database with ten measurement conditions with each measurement condition having only three values would require approximately 60000 graphs of the type discussed above in the simple case in which associations are sought one measurement condition at a time. Hence, the number of graphs that must be explored is beyond the capabilities of a user without help.

The present invention mitigates this problem by computing a relevance measure for each measurement condition value. The possible measurement condition value associations with the target group are then prioritized by the relevance measure. Those associations that have relevance measures below a threshold value are eliminated from consideration. The associations that have relevance measures above the threshold are ordered and presented to the user for the user's consideration.

In one aspect of the invention, the associations are ordered by a measure of a measurement condition that is common to the target group but relatively uncommon to the remainder group. In one aspect of the invention, the relevance measure is computed from a ratio of the percentage of target group rows in the table for the measurement condition value being tested to the percentage of remainder group rows that match the measurement condition value.

Figure 6:
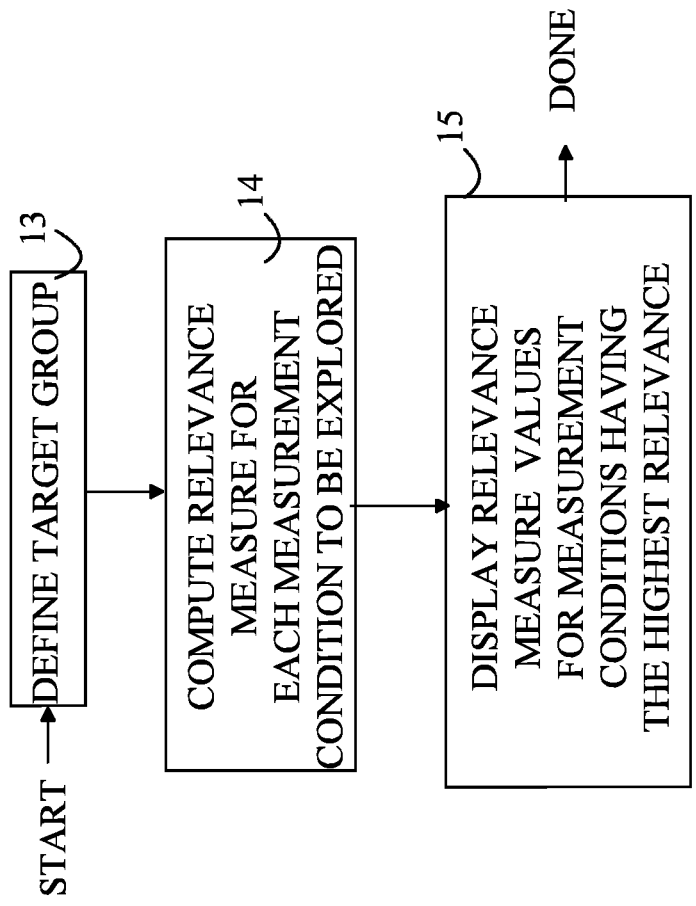
FIG. 6 is a flow chart of one embodiment of the method of the present invention.

Refer now to FIG. 6, which is a flow chart of one embodiment of the method of the present invention. This embodiment starts by defining the target group as shown at 13. The target group comprises the rows of the measurement table that satisfy some algorithm based on the measured parameter values in each of those rows. In the simplest case, the target group is determined by the measured parameter values in a single measured parameter column. For example, the target group is all rows in which the value in the first measured parameter column is greater than some target threshold value. The target threshold can be a single numeric value, i.e., all rows with the first measured parameter value greater than 10. In another example, the target threshold could be defined in terms of the statistical distribution of the measurement column values. For example, all rows with the first measured parameter column greater than some number of standard deviations of that statistical distribution.

In some embodiments, the data processing system can define the target group without specific user input. In other embodiments, the user provides input that determines the target group. To aid the user in determining the target group, the data processing system generates a plot of the statistical distribution of the values in one or more of the measured parameter columns.

In other examples, the target group is defined in terms of a function of the measured parameter values in multiple measured parameter columns. For example, the $i^{th}$ row of the measurement table could be assigned to the target group if $M1(i)-M2(i)>T$, where $M1(i)$ is the value in the $i^{th}$ row of measured parameter column M1, and $M2(i)$ is the value in the $i^{th}$ row of measured parameter column M2.

In one aspect of the invention, the remainder group consists of all rows of the measurement table that are not in the target group. However, embodiments in which the remainder group has fewer rows can also be constructed. For example, the remainder group could also be defined in terms of some algorithm that depends on the measured parameter column values in the rows that are not in the target group in a manner analogous to that discussed above for the target group.

Refer again to FIG. 6. After the target and remainder groups have been defined, a relevance measure is computed for each measurement condition to be explored as shown at 14. Consider one of the measurement condition columns. This column has values for a specific measurement condition such as the temperature of a component in the device being tested, the identity of some key component in the device such as its antennae type or the model number of a particular module, etc. A measurement condition whose values are contained in one measurement condition column must have a plurality of different values and there must be a plurality of rows with each of the different values to be of interest. The goal of the relevance measure is to identify the values in the measurement condition column that are more likely to be associated with the target group than the remainder group, and provide a means for ordering the values based on the strength of this association.

Hence, to be of interest, a measurement condition must have a plurality of different values. In the simplest case, a measurement condition depends on the values in only one measurement condition column. More complex measurement conditions will be discussed in detail below. In general, there must be multiple rows in the measurement table having the same value for each measurement condition value. As noted above, in one aspect of the invention, the relevance measure is computed from a ratio of the percentage of target group rows in the table for the measurement condition value being tested to the percentage of remainder group rows that match the measurement condition value. A relevance measure value is computed for each measurement condition value. For example, if the measurement condition is the temperature of a component of the circuit board, and the temperature is quantized to high, medium, and low values, the measurement table has three different measurement condition values for the temperature and three relevance measures will be computed for that measurement condition corresponding to those three different values.

In one aspect to the invention, the data processing system computes a relevance measure for each distinct possible measurement condition value. Those measurement condition values for which the relevance measure is greater than a relevance threshold are then displayed to the user as shown at 15 in FIG. 6. In one aspect, the measurement/value and the relevance measure are ordered by the relevance measure. If the number of measurement conditions is large and/or the number of distinct values in the measurement condition columns is large, the computational workload for this procedure can be limiting.

In one aspect of the invention, the data processing system displays a menu of the possible measurement conditions and allows the user to specify which of these possible measurement conditions are to be considered rather than computing a relevance measure for each possible value of each measurement condition.

The user can also specify a quantization algorithm for the measurement condition possible values for a selected measurement condition. In one aspect of the invention, the user specifies the number of quantization values to be used, and the data processing system breaks the range of observed measurement condition values into equal sized ranges, assigning a unique digital value or name to each range. In another aspect, the user can specify a quartile quantization scheme in which the lower 25 percent of the values are quantized to a first quantization value, the upper 25 percent are quantized to a second quantization value, and the remaining 50 percent are quantized to a third quantization value.

After the relevance measures have been computed for each possible association, the data processing system displays a table of the measurement conditions and the corresponding relevance measure for relevance measures above a threshold value. Optionally, a frequency distribution of the measured parameter values in the target group corresponding to each association that has a relevance measure greater than a display threshold value is displayed.

In the above example, the target group was a group of outliers that have jitter values that are substantially greater than those of the remainder group. However, the target group could be any subset of rows. For example, a test engineer might wish to explore the associations for test boards that exhibit much lower jitter to gain insight into possible design changes that could reduce jitter.

In the above-described embodiments, the measured parameters are scalar in nature. That is, the measured parameters are numbers or labels that could be mapped to numbers. The simplest scalar measured parameter is a two-state binary number or label, such as "pass", "fail". In the case of a binary measured parameter, the groups are already defined. Typically, the user is looking for information on the causes of the failures.

However, embodiments in which the measured parameters are vectors can also be treated with the method of the present invention. If the measured parameter is an N-dimensional vector, the boundary between the target group and the remainder group will be a surface in the N-dimensional space. Consider a production line in which parts are tested with each test generating an N-dimensional vector of test values. Parts that are known to be free of defects are measured on the testing system and form a learning sample for calibrating the test system. The results of the learning sample are used to define a surface in the N-dimensional space that contains some predetermined fraction of the learning sample. The surface in question is often an N-dimensional ellipsoid. This surface, or a surface related to it, can then be used for the boundary between the target group and the remainder group. In one example, the target group is the group of tested parts that lie outside the surface and are defined to be failed parts.

If N=2, the displays provided by the present invention can be in the form of topological maps in three-dimensions that can be viewed isometrically. For higher dimensions, providing the final displays presents challenges; however, an analysis of the relevance measures for the various measurement conditions can still provide insights into the potential causes of the differences between the target group and the remainder group.

The measurement conditions in the above-described embodiments are also scalar valued quantities or quantities that can be mapped to a scalar variable. However, the measurement conditions can also be vector-valued quantities. For example, two columns in the table can be treated as a single two-dimensional vector. In this case, relevance measures would be computed for all possible values of the two-dimensional vector. Since the computational workload increases exponentially with the number of dimensions, quantization of measurement conditions that form a component of such a vector-valued measurement condition are preferably quantized before seeking associations between the target group and the measurement conditions.

As noted above, the set of measurements in the database is equivalent to a table having one column for each measurement condition and one column for each measured parameter. Each row in the table stores one measurement for each of the measured parameters. The measurement condition columns in that row store the measurement conditions associated with that set of measured parameter values.

This table will be referred to as the measurement table in the following discussion. The measurement table may be a single table stored in the database or a plurality of tables in the database that can queried to form such a single table.

As noted above, the use of quantization of the measurement conditions provides significant advantages in terms of computational workload and improved statistical confidence. In one aspect of the invention, after the data processing system loads the measurement table with the experimental values, the data processing system offers the user an option to add columns to the measurement table. Each added column is tied to one or more of the existing columns and derived from any algorithm relating the new column values to the values in the existing column(s). The user is then presented with pre-programmed options on the relationship between the existing column and the entries in the new column. One of those options is to quantize the values in the existing column. The user can select an option in which the data processing system automatically quantized one or more of the measurement conditions without human interaction.

Alternatively, the user can select an option that allows the user to provide input as to the quantization algorithm for one or more of the measurement conditions. In one aspect of the invention, if the user selects this option, the data processing system asks the user for the number of states in the quantized parameter and the method for mapping the existing values to the states of the quantized parameter. The default mapping is to divide the range of values in the existing column into equal ranges that span the values and assign a numeric value to each range. In one additional option, the data processing system presents the user with the range of values in the existing table and then allows the user to enter a range for each quantized value.

When the user specifies the measurement condition columns to be included in the analysis, the user can specify the quantized column and not specify the original column. If the analysis indicates that one particular range in the quantized values is of interest, the user can then go back and define a new quantization mapping that emphasizes that range and re-run the analysis.

The method of the present invention is preferably practiced on a data processing system in real time such that the user can explore the measurement data set with different levels of quantization and thresholds while the user is at the data processing system. As noted above, when the number of possible states of a measurement condition is large and/or the number of possible measurement conditions is large, the computational workload can be significant, especially for very large measurement sets that can have hundreds of thousands of individual measurements.

In one aspect of the invention, the time to compute an analysis of the dataset is reduced by utilizing multiple processors running in parallel. The analysis of each measurement condition can be run independent of the analysis of the other measurement conditions. Accordingly, the present application is well suited to parallel processing schemes in which each processor computes the relevance measures for one of the measurement conditions. In addition, the computation of a relevance measure for a given measurement condition value does not rely on the results of any other relevance measure. Hence, if there are more processors available, each process can produce one relevance measure for one instance of the measurement condition value in parallel with the other processors.

In addition, the data required by each processor consists of two column vectors. In the case of scalar measurement conditions and measured parameters, the data is stored in a column corresponding to the measurement condition and the column containing the measured parameter values. Hence, each processor can store its required data separately for the column containing the measurement conditions. The processors can store the measured parameter values or each processor can receive its own copy of that data at setup.

Figure 7:
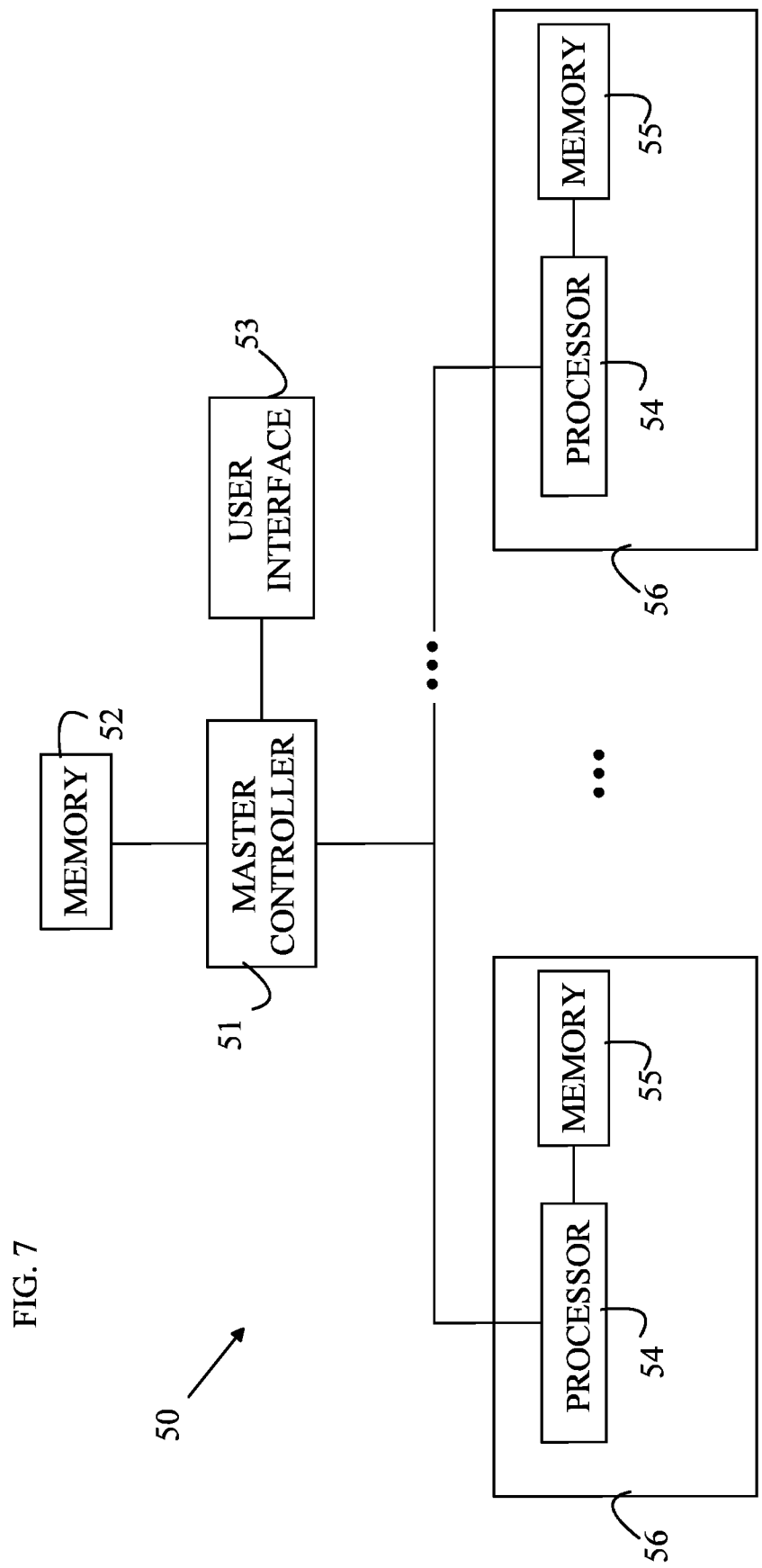
FIG. 7 illustrates one exemplary hardware embodiment of the present invention.

Refer now to FIG. 7, which illustrates one exemplary hardware embodiment of the present invention. Data processing system 50 includes a master controller 51 that manages a group of relevance processors 56 that compute the relevance measures. Master controller 51 also interacts with the user via a user interface 53 to obtain the data discussed above that determines which measurement conditions and measured parameters are to be analyzed. Master controller 51 also interacts with a memory 52 that stores the database tables that make up the measurement table.

Master controller 51 loads the individual relevance processor 56 with the measurement condition(s) that are be processed by that relevance processor at the beginning of the session with the user. If the user chooses to create a new column, master controller 51 populates that column and then assigns that column's data to one of the pluralities of relevance processors 56. Master controller 51 receives each relevance measure value from each of the relevance processors 56 as those values become available and orders the results for communication to the user.

Each of the relevance processors 56 includes a processor 54 that has access to a memory 55 that stores the column of the measurement table processed by that relevance processor. Memory 55 can be part of memory 52 or a separate memory that is loaded from memory 52 that reduces the number of accesses to memory 52 during the various relevance computations. In one exemplary embodiment, the database managed by master controller 51 is distributed between memory 52 and each of the memories 55 in the relevance processors 56. In this exemplary embodiment, the measurement condition columns are stored in the relevance processors 56 such that the column(s) of data for the measurement conditions processed by a given relevance processor are stored with that relevance processor. The measured parameter values are stored in memory 52 in this embodiment; however copies of the measured parameter values can optionally be stored in memories 55.

The present invention also includes a computer readable medium that stores instructions that cause a data processing system to execute the method of the present invention. A computer readable medium is defined to be any medium that constitutes patentable subject matter under 35 U.S.C. 101 and excludes any medium that does not constitute patentable subject matter under 35 U.S.C. 101. Examples of patentable media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method of operating a data processing system to analyze a database comprising a measurement table characterized by one or more measurement condition columns and one or more measured parameter columns, each row of said measurement table corresponding to an instance of measured parameter values and measurement condition values associated with said measured parameter values, said method causing said data processing system:

to define a target group comprising a plurality of rows in said measurement table and a remainder group comprising a plurality of rows in said measurement table that are different from said target group;

to define a measurement condition to be explored, said measurement condition values having a plurality of different values;

to compute a relevance measure for each of said different values; and to display a list of each of said different measurement condition values and said relevance measure corresponding to that measurement condition value for measurement condition values that have relevance measures greater than a display threshold.

2. The method of claim 1 wherein said list is ordered by said relevance measures.

3. The method of claim 1 wherein said data processing system displays a statistical distribution of said measured parameter values for a selected one of said measured parameter columns, and receives user input as to a threshold value that separates said target group from said remainder group.

4. The method of claim 1 wherein said target group comprises rows in which said measured parameter values satisfy a condition specified by a user.

5. The method of claim 1 wherein said data processing system displays a statistical distribution of measured parameter values in said target group.

6. The method of claim 1 wherein said data processing system quantizes said measurement condition values in one of said measurement condition columns.

7. The method of claim 6 wherein said data processing system utilizes user input that determines a number of quantized states to use in quantizing said measurement condition values.

8. The method of claim 1 wherein said data processing system adds a measurement condition column to said measurement table in response to user input.

9. The method of claim 8 wherein a user specifies an algorithm for populating said added measurement condition column, said algorithm depending on one or more of measured condition values in other measurement condition columns.

10. The method of claim 1 wherein said data processing system adds a measured parameter column to said measurement table in response to user input.

11. The method of claim 10 wherein a user specifies an algorithm for populating said added measured parameter column, said algorithm depending on one or more measured parameter values in other measured parameter columns.

12. A computer readable medium comprising instructions that cause a data processing system to execute the method of claim 1.

13. A data processing system adapted for analyzing a database comprising a measurement table characterized by one or more measurement condition columns and one or more measured parameter columns, each row of said measurement table corresponding to an instance of measured parameter values and measurement condition values associated with said measured parameter values, said data processing system comprising:

a plurality of relevance processors, each of said plurality of relevance processor comprising a measurement condition column memory that stores a corresponding one of said measurement condition columns; and a master data processor comprising a memory that stores said measured parameter columns;

a user interface adapted for receiving instructions from a user and displaying computational results to said user, said master data processor defining a target group comprising a plurality of rows in said measurement table and a remainder group comprising a plurality of rows in said measurement table that are different from said target group, and defining one or more measurement conditions to be explored, said measurement condition values having a plurality of different values, wherein each of said relevance processors computing a relevance measure for each of said different values for said measurement condition stored in that relevance processor; and said master processor displaying a list of each of said different measurement condition values and said computed relevance measure for that measurement condition value.

14. The data processing system of claim 13 wherein said list is ordered by said relevance measures.

15. The data processing system of claim 13 wherein said data processing system displays a statistical distribution of said measured parameter values for a selected one of said measured parameter columns, and receives user input as to a threshold value that separates said target group from said remainder group.

16. The data processing system of claim 13 wherein said target group comprises rows in which said measured parameter values satisfy a condition specified by a user.

17. The data processing system of claim 13 wherein said data processing system quantizes said measurement condition values in one of said measurement condition columns.

18. The data processing system of claim 17 wherein said data processing system utilizes user input that determines a number of quantized states to use in quantizing said measurement condition values.

19. The data processing system of claim 13 wherein said data processing system adds a measurement condition column or a measured parameter column to said measurement table in response to user input.

20. The data processing system of claim 19 wherein a user specifies an algorithm for populating said added measurement condition column or measured parameter column, said algorithm depending on one or more of said measurement condition column values or measured parameter column values, respectively, in said measurement table.

* * * * *